United States Patent [19]

Brown et al.

[11] Patent Number: 4,876,506

[45] Date of Patent: Oct. 24, 1989

[54] APPARATUS AND METHOD FOR INSPECTING THE PROFILE OF THE INNER WALL OF A TUBE EMPLOYING A WALL FOLLOWER AND AN EDDY CURRENT PROBE

[75] Inventors: Stephen D. Brown, Delmont; Warren R. Junker, Monroeville; Francis X. Gradich, Elizabeth Township, Allegheny County, all of Pa.

[73] Assignee: Westinghouse Electric Corp., Pittsburgh, Pa.

[21] Appl. No.: 205,768

[22] Filed: Jun. 13, 1988

[51] Int. Cl.$^4$ .......................... G01B 7/28; G01B 7/14; G01N 27/90; G21C 17/00
[52] U.S. Cl. ................................. 324/220; 33/178 E; 324/207; 376/249
[58] Field of Search ............................... 324/219–221, 324/207; 33/178 E, 178 F, 302; 376/249; 73/151

[56] References Cited

U.S. PATENT DOCUMENTS

| | | | |
|---|---|---|---|
| 2,239,981 | 4/1941 | Terry et al. | 33/178 E |
| 3,831,084 | 8/1974 | Scalese et al. | 324/219 X |
| 4,153,875 | 5/1979 | Pigeon et al. | 324/220 |
| 4,228,593 | 10/1980 | Frank et al. | 33/178 F |
| 4,235,020 | 11/1980 | Davis et al. | 33/178 F |
| 4,253,241 | 3/1981 | Nansteil, Jr. | 33/178 R |
| 4,265,025 | 5/1981 | Finlayson et al. | 33/178 F |
| 4,337,431 | 6/1982 | Hale | 324/220 |
| 4,461,171 | 7/1984 | de la Cruz | 324/207 X |
| 4,555,855 | 12/1985 | Golinelli et al. | 324/207 X |
| 4,563,643 | 1/1986 | Leschek et al. | 324/207 |
| 4,625,165 | 11/1986 | Rothstein | 324/220 |
| 4,673,879 | 6/1987 | Harris et al. | 324/240 |
| 4,766,374 | 8/1988 | Glass, III et al. | 324/207 |

Primary Examiner—Gerard R. Strecker

[57] ABSTRACT

Both an apparatus and method for accurately inspecting the profile of the inner wall of a conduit, such as a heat exchanger tube in a steam generator, is disclosed herein. The apparatus comprises a cylindrical probe body that is insertable within the tube, a probe assembly disposed within the probe body that includes an eddy current sensing coil and a copper plate which are movable with respect to one another, and a wall follower assembly including a stylus on one end and which is linked to the probe assembly on its other end for converting changes in the radius of the tube wall into changes in the distance between the eddy current sensing coil and the copper plate. A ferrite core is disposed within the sensing coil for focusing the electromagnetic flux into the copper plate. Additionally, the sensing coil is serially connected to a balancing coil in order to provide an accurate zero point for the sensing coil. In the preferred embodiment, the sensing coil is stationarily mounted within the probe body, while the copper plate is connected to the radially movable stylus assembly. The probe body and all of the components of the wall follower assembly including the springs which resiliently urge the stylus toward the tube wall are formed from nonconductive plastic materials so as to maximize the electromagnetic coupling between the eddy current sensing coil and the copper plate. The apparatus is capable of accurately detecting not only localized flaws within the inner tube wall, but also tube ovality and wall thinning which are typically caused by the deposition of sludge in the crevice regions of tubesheets and support plates of steam generators.

24 Claims, 4 Drawing Sheets

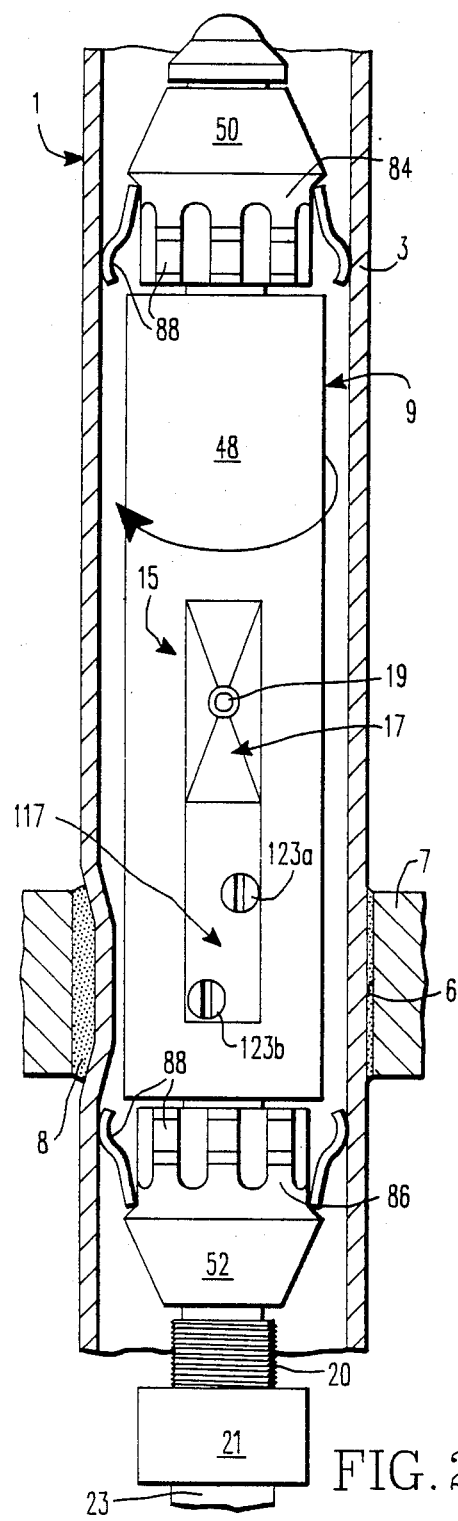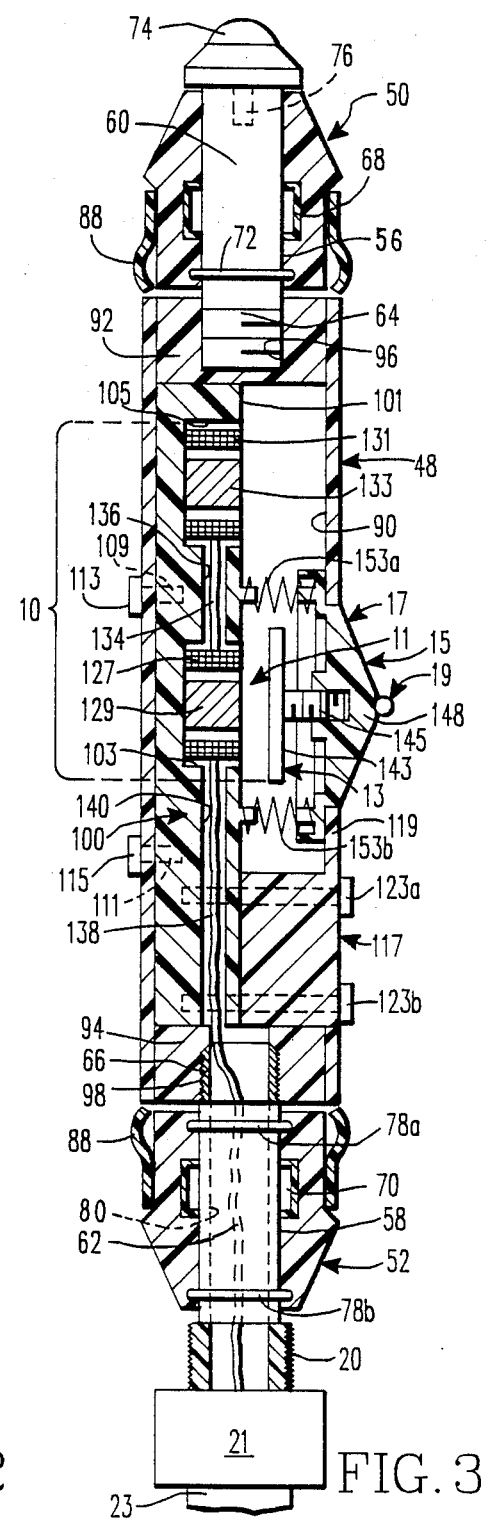

APPARATUS AND METHOD FOR INSPECTING THE PROFILE OF THE INNER WALL OF A TUBE EMPLOYING A WALL FOLLOWER AND AN EDDY CURRENT PROBE

BACKGROUND OF THE INVENTION

This invention generally relates to an apparatus and method for inspecting the profile of the inner wall of a conduit, and is specifically concerned with inspecting the inner diameter profiles of Inconel ® heat exchanger tubes in nuclear steam generators.

Probes for inspecting the inner walls of metallic conduits are known in the prior art. Such probes are particularly useful in inspecting the internal walls on the Inconel ® tubes used as heat exchangers in nuclear steam generators for flaws or deformation caused by corrosion, fretting, or the accumulation of sludge products in the crevice regions of the generator. Generally, these probes operate by means of either strain gauges, or eddy current probes Strain gauge-type profilometer probes are generally formed from a cylindrical mandrel that is circumscribed by a plurality of the spring-loaded fingers. Strain gauges are placed onto each of the spring-loaded fingers. When the probe body is inserted into the interior of a tube and translated along its longitudinal axis, differences in the radius of the internal tube walls cause one or more of the spring fingers to flex in a radial direction. The extent to which these fingers flex is picked up by the strain gauges attached thereto. Eddy current-type profilometer probes are generally formed by an eddy current coil resiliently mounted in a probe head so as to wipingly engage the interior of the tube being inspected when the probe is rotated. The coil is electrically connected to a current generator which conducts an alternating current to the coil as it is moved. An impedance detecting circuit which may take the form of an inductive bridge is also connected across the leads of the coil. In operation, the alternating current conducted through the coil excites it into generating a pulsating magnetic field whose magnitude and polarity changes in accordance with the frequency of the current. When the coil of the probe is positioned in the vicinity of an electrically conductive wall, the changing magnetic flux emanating from the coil induces eddy currents in a portion of the wall. The particular amperage, voltage and direction of the eddy currents produced are dependent in part upon the specific impedance of the portion of the wall that conducts the eddy current. Because of the direction of flow of the eddy currents generated by the coil is opposite to the current flowing through the probe sensing coil, the magnetic field created by the eddy currents creates an impedance in the sensing coil. The strength of these eddy currents is in turn dependent upon the resistance that these currents encounter as they circulate through the wall. Since flaws in the metal wall (such as cracks, pits or regions of local thinning) create regions of higher resistances at flaw locations, eddy current probes may be used to locate flaws by constantly , monitoring the impedances of the sensing coils as the probe body is moved along the internal walls of the tube.

While some prior art profilometry probes are capable of performing satisfactory inspections of heat exchanger tubes, the applicants have noted a number of problems associated with these probes which has limited their usefulness.

Strain gauge-type profilometry probes tend to be delicate since they require the mounting of very small strain gauges onto the resilient metal fingers that circumscribe the probe body. The stain gauges themselves are small and delicate, as are their lead wires (which are hairline fine). Both the strain gauges themselves and their lead wires are prone to breakage if the probe is subjected to inadvertent mechanical shock, or is even rapidly drawn through an unusually rough portion of tube. While strain gauge-type profilometers are capable of detecting the presence of ovality in such tubes (which in turn indicates if the tube has been stressed as a result of intense, localized pressure, the flaw resolution of many of these types of profilometers is relatively coarse. If the flaw resolution is increased by the addition of more spring fingers and strain gauges around the circumference of the probe, the gauges must be made even smaller, which increases the fragility of the device even more.

Eddy current type profilometry probes can also suffer from excessive fragility in designs where a tiny coil resiliently engages the interior of a wall in wiping contact. While some of the better probe designs overcome this defect by either potting the eddy current probe in a self-lubricating plastic (which is subject to wear), or by attaching the coil to the back of a stylus which resiliently engages the inner tube wall as the probe is translated therein, none of these designs, to the knowledge of the applicants, is capable of accurately resolving tube ovality. Such ovality may occur when sludge deposits precipitate in the small annular space between the outer walls of the heat exchanger tubes and the bores of the support plates in the steam generators. The accumulation of such sludge deposits sometimes subjects one side or the other of the outer walls of the tubes to pressures great enough to render the cross section of the tube into an oval, and may even dent the tube. Such tube ovality is an important indicator of the potential for the tube to undergo stress corrosion cracking, which could lead to the undesirable result of the contamination of the nonradioactive water that is used to generate turbine-turning steam in the plant with the radioactive water which flows through the core of the nuclear reactor.

Clearly, there is a need for a profilometry probe that is sturdy enough in construction to reliably operate even when subject to inadvertent mechanical shock, but yet capable of accurately detecting tube ovality as well as other types of tube flaw such as pitting, cracking and wall thinning. Ideally, such a probe should be able to detect these flaws with even more accuracy and resolution than prior art eddy current type profilometry probes. Finally, it would be desirable if such a profilometry probe were easily manufactured from inexpensive and easily obtainable components.

SUMMARY OF THE INVENTION

Generally speaking, the invention is an apparatus for inspecting the profile of the inner wall of a conduit which overcomes the aforementioned shortcomings of the prior art and which is well adapted for detecting ovality in the heat exchanger tubes of steam generators. The apparatus of the invention generally comprises an elongated probe body which is insertable within a conduit or tube, a probe assembly disposed within the probe body which includes a plate and a probe for generating a signal indicative of the distance between the probe and the plate wherein the plate and probe are movable with respect to each other, and a wall follower assembly movably mounted within the probe body. The wall follower has a stylus on one side for resiliently following the profile of the inner wall of the conduit or tube, and is connected to the plate of the probe assembly on its other side such that changes in the conduit wall profile are mechanically converted into changes in the distance between the probe and the plate.

In the preferred embodiment, the probe is an eddy current probe having a sensing coil and a balancing coil, and the plate is a plate of high-conductivity, oxygen free copper which is mounted behind the stylus of the wall follower. The sensing coil of the eddy current probe is mounted within the probe body in close proximity to the copper plate, and circumscribes a ferrite core which focuses the electromagnetic field generated by the coil into the plate, thereby strongly coupling the sensing coil to the copper plate. The probe body includes a midsection which contains the wall follower assembly, as well as distal and proximal sections rotatably connected to the ends of the midsection which include resilient centering members for accurately aligning the longitudinal axis of the probe body with the longitudinal axis of the probe.

In operation, the midsection of the probe body is rotated by way of a flexible shaft connected to an electric motor. The probe body is coupled to the flexible shaft by way of a threaded rod so that the entire probe moves in a helical path in "riding nut" fashion as the motor rotates the flexible shaft. Since the wall follower assembly converts changes in the radius of the inner wall of the conduit or tube into a change in the distance between the sensing coil of the eddy current probe and the copper plate, the apparatus of the invention is capable of accurately resolving small variations in the radius of such tubes and conduits due to tube ovality.

To further enhance the sensitivity of the device, both the probe body and all of the components of the wall follower assembly preferably are formed from nonconductive materials such as Delrin or nylon. Additionally, the eddy current probe not only includes a balancing coil that accurately provides a "zero" reference point for the sensing coil of the probe, but further is operated at a frequency of approximately 1 megahertz so that substantially all of the field generated by the sensing coil couples with the copper plate attached to the stylus of the wall follower assembly.

BRIEF DESCRIPTION OF THE SEVERAL FIGURES

FIG. 2 is a side view of the apparatus of the invention inspecting a heat exchanger tube;

FIG. 3 is a cross-sectional side view of the cylindrical probe body of the apparatus of the invention, illustrating the components of both the eddy current probe and the wall follower assembly disposed within the probe body;

DETAILED DESCRIPTION OF THE PREFERRED EMBODIMENT

General Overview of the Structure and Operation of the Invention

Figure 1:
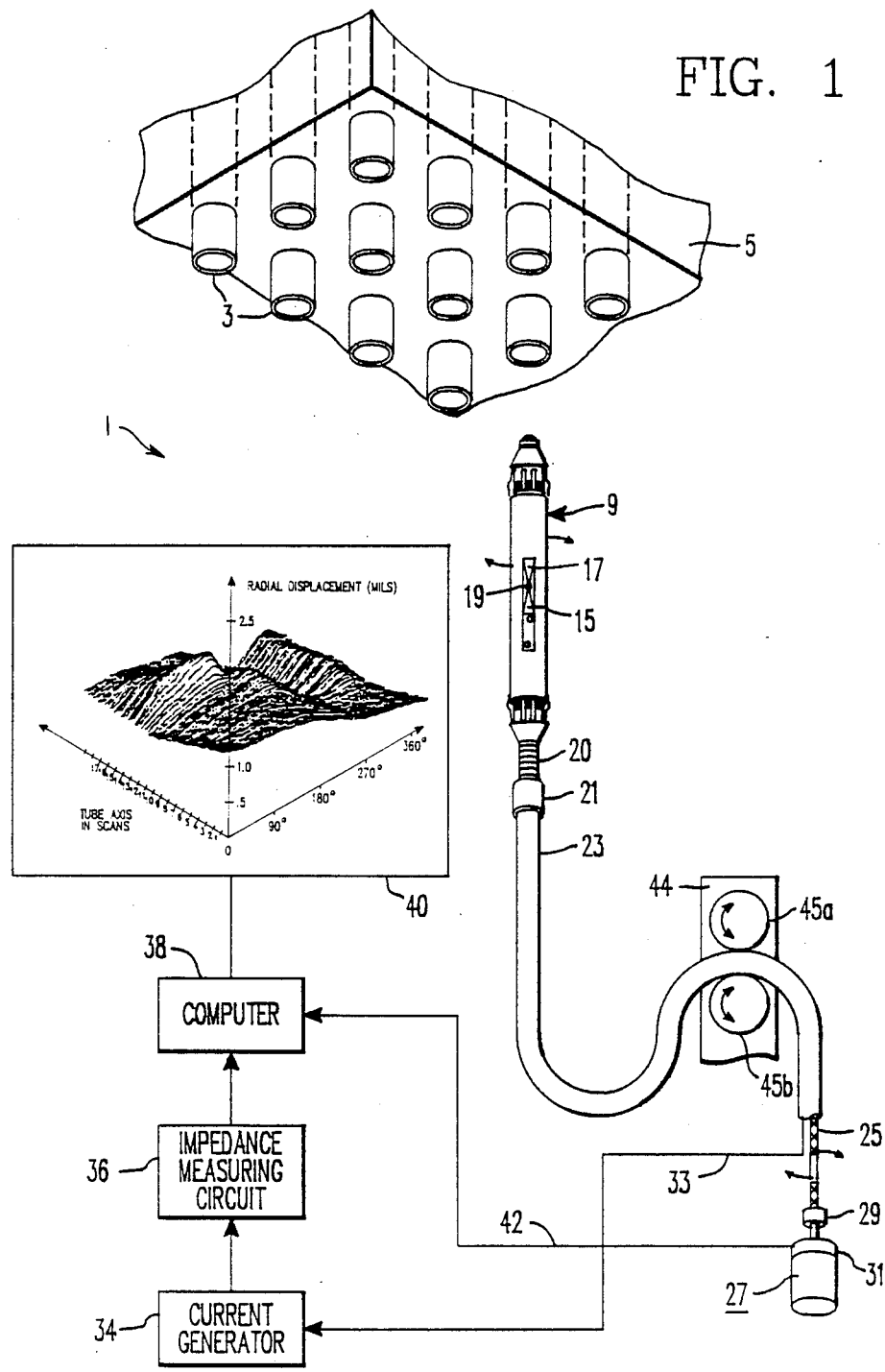
FIG. 1 is a perspective partial schematic view of the profile inspecting apparatus of the invention.

With reference to FIGS. 1, 2 and 3, wherein like numerals designate like components throughout all of the several figures, the profile inspection apparatus 1 of the invention is particularly adapted for inspecting the internal wall of a heat exchanger tube 3. At their bottom portions, such heat exchanger tubes 3 are typically mounted in tubesheets 5, as is illustrated in FIG. 1. At their upper portions, such heat exchanger tubes 3 typically extend through circular bores 6 present in support plates 7, as is illustrated in FIG. 2. As has been previously indicated, one of the purposes of the profile inspection apparatus 1 is to detect regions in the heat exchanger tubes 3 which have been deformed into an ovate shape or otherwise damaged. Such ovate regions may come about as a result of a deposition of sludges 8 in the small annular space between the bore 6 of a support plate 7, and the outer walls of the heat exchanger tube 3.

The profile inspection apparatus 1 comprises a cylindrical probe body 9 that contains a probe assembly 10 formed from an eddy current probe 11, and a copper plate 13 which is movable with respect to the probe 11. the probe body 9 further contains a wall follower assembly 15 that is radially and resiliently mounted within the body 9. The wall body follower assembly 15 includes a rectangular follower body 17 which tapers into a rolling ball stylus 19 on its outer face, and which is connected to the copper plate 13 on its inner face.

With reference again to FIG. 1, the proximal end of the cylindrical probe body 9 is coupled to a rotatable threaded shaft 20 that extends into a connector assembly 21. The connector assembly in turn is attached to a flexible hollow cable 23. Centrally disposed within the hollow cable 23 is a flexible shaft 25 which is connected to a motor 27 by way of a coupling 29. The motor 27 includes an optical encoder 31 which generates an electrical signal everytime the shaft of the motor 27 turns 360 degrees. Also disposed within the flexible hollow cable 23 is a multiple wire electric cable 33. The cable 33 connects the lead wires of the eddy current probe 11 to eddy current circuitry formed from a current generator 34 which in turn is connected to an impedance measuring circuit 36. The output of the impedance measuring circuit 36 is connected to the input of a computer 38, whose output is connected to a CRT screen 40. A cable 42 further connects the output of the optical encoder 31 into the input of the computer 38. In the preferred embodiment, the current generator 34 and impedance measuring circuit 36 are part of a model MIZ 18 eddy current generator manufactured by Zetec, located in Isaquah, Washington, and the computer is a model HP 9836 and an IEEE 488 interface manufactured by Hewlett-Packard located in Palo Alto, Calif. as modified by a Zetec DDA-4 processing package. An advancing and retracting mechanism 44 having a pair of motor-operated, resilient rollers 45a, 45b advances and retracts the probe body 9 along the longitudinal axis of a selected heat exchanger tube 3 by applying tensile or compressive forces onto the hollow cable 23. Although not specifically shown in any of the several figures, the connector assembly 21 includes an arrangement of conductive slip rings so that the multiple wire electrical cable 33 can maintain contact with the leads of the eddy current probe 11 despite the rotation of the probe body 9 relative to the cable 23 during the operation of the apparatus 1. Such a slip ring configuration is illustrated in U.S. patent application Ser. No. 079,860 filed July 30, 1987 and assigned to the Westinghouse Electric Corporation, the entire specification of which is expressly incorporated herein by reference. Additionally, the connector assembly connects the threaded shaft 20 to the flexible shaft 25.

In operation, the probe body 9 of the profile inspection apparatus 1 is inserted into a tube 3 to be inspected. Next, the advancing and retracting mechanism 44 is actuated to slide the probe body 9 adjacent to the particular section of the tube 3 to be inspected. In practical terms, this usually corresponds to the area of the tube 3 surrounded by either the tubesheet 5 or a support plate 7. In implementing this step, the position of the probe body 9 along the longitudinal axis of a particular tube 3 is determined by either the output of another eddy current probe (not shown) which circumscribes a portion of the probe body 9, or by monitoring the number of revolutions that the resilient rollers 45a, 45b make in sliding the probe body 9 up along the axis of a selected tube 3. After the probe body 9 has been positioned into the section of the tube 3 to be inspected, the optical encoder 31 is actuated, as are the current generator 34, the impedance measuring circuit 36 and the computer 38. Motor 27 is then actuated in order to rotate the probe body 9 relative to the connector assembly 21. The rolling ball stylus 19 then begins to trace a helical path along the inner wall of the tube 3 in accordance with the screw pitch of the threaded shaft 20. Variations in the diameter of the inner wall of the tube 3 cause the copper plate 13 to move relative to the eddy current probe 11 which in turn induces variations in the impedance experienced by the eddy current probe 11. The computer 38 translates these variations of impedance into mils, and projects the results of each helical scan onto the CRT tube 40.

Specific Description of the Profile Inspection Apparatus and Method

Figure 4:
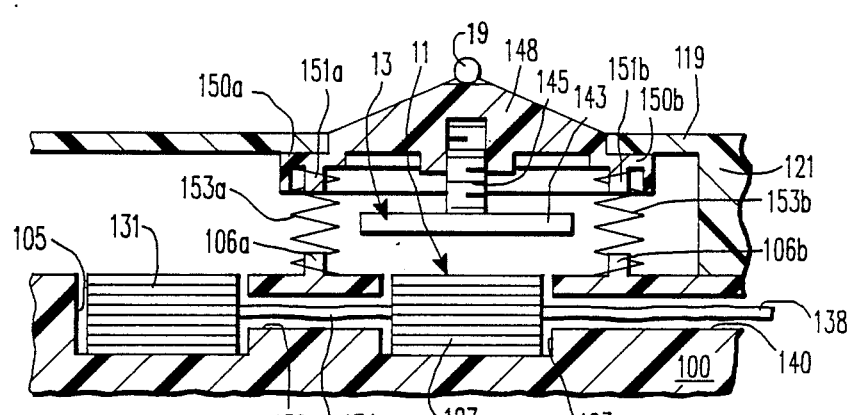
FIG. 4 is an enlarged view of the wall follower assembly and eddy current probe illustrated in FIG. 3.

With reference now to FIGS. 2, 3 and 4, the cylindrical probe body 9 generally includes a rotatable midsection 48, a tapered distal section 50 at its top end, and a tapered proximal section 52 at its bottom end. Both the distal and proximal sections 50, 52 include longitudinal bores 56, 58 into which stub shafts 60 and 62 are journaled. The proximal end 64 of stub shaft 60 is threaded as is the distal end 66 of stub shaft 62. These threaded ends 64 and 66 are screwed into the distal and proximal ends of the midsection 48 of the probe body 9 as shown in FIG. 3. To reduce friction between the shafts 60 and 62 in the longitudinal bores 56 and 58, both the distal and proximal sections 50 and 52 include roller bearings 68 and 70. To secure the distal section 50 to the stub shaft 60, a snap ring 72 is provided along with a tapered end cap 74. The end cap 74 includes screw threads 76 which may be screwed into a threaded bore present at the top end of the shaft 60. The interior of the snap ring 72 is received within a groove (not shown) which circumscribes the shaft 60, while the outer portion of the ring 72 fits within another groove present within the longitudinal bore 56 in order to form an interference-type connection between the shaft 60 and the bore 56. The proximal section 52 of the probe body 9 is similarly mounted to the shaft 62 by way of snap rings 78a, 78b, which are identical in structure and function to the previously discussed snap ring 72.

Stub shaft 62 differs from the previously mentioned stub shaft 60 in two important respects. First, stub shaft 62 includes a longitudinal bore 80 for conducting the lead wires of the eddy current probe 11 to the multiple-wire electrical cable 33. Secondly, stub shaft 62 is integrally connected to the threaded shaft 20 which the flexible shaft 25 connected to motor 27 is engaged to. In the preferred embodiment, the pitch of the screw threads of threaded shaft 20 should be between 20 and 30 mils. Such a screw pitch guarantees that the scans of the inner wall of the tube 3 rendered by the rolling ball stylus 19 and the eddy resolution to detect ovality through various small lengths of the tube 3, as well as pits or cracks or other types of flaws which present a relatively small area to the rolling ball stylus 19 of the wall follower assembly 15.

Circular centering members 84 and 86 circumscribe the exterior of both the distal section 50 and proximal section 52 of the cylindrical probe body 9. Each of these centering members 84 and 86 includes a plurality of canter-levered, resilient fingers 88, each of which applies approximately the same spring force between the probe body 9 and the interior of the tube 3 being inspected. The spring fingers 88 reliably and accurately align the longitudinal axis of the probe body 9 with the longitudinal axis of the tube 3. Such accurate alignment is necessary for the proper operation of the profile inspection apparatus I if small amounts of tube ovality are to be reliably perceived by the apparatus 1.

Figure 5:
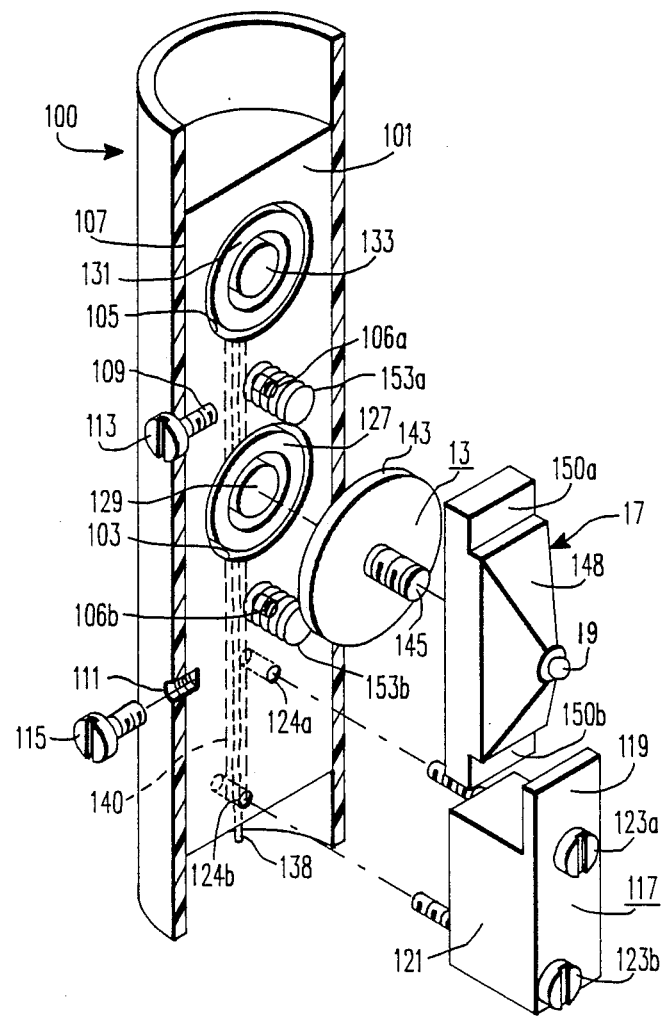
FIG. 5 is an exploded perspective view of the wall follower assembly and eddy current probe illustrated in FIG. 4.

The rotatable midsection 48 includes a tubular housing 90 capped by a distal end plug 92 at its top end, and a proximal end plug 94 at its bottom end. Both of the end plugs 92 and 94 include threaded bores 96 and 98 along their longitudinal axes for receiving the threaded ends of the previously discussed stub shafts 60 and 62. With specific reference now to FIG. 5, a semicylindrical support member 100 is disposed within the interior of the midsection 48 which supports the sensing and balancing coils of the eddy current probe 11. To this end, the semicylindrical support member 100 includes a flat side 101 having two cylindrical recesses 103 and 105 for receiving the coils of the eddy current probe 11. Additionally, the flat side 101 includes a pair of spring guideposts 106a and 106b for receiving and guiding the nonmetallic coil springs which resiliently bias the rolling ball stylus 19 of the wall follower assembly 15 against the inner wall of a tube 3. The arcuate side 107 of the semicylindrical support member 100 is complementary in shape to the interior of the tubular housing 90, and includes a pair of threaded bores 109, 111 for receiving said screws 113 and 115 which securely attach the member 100 to the housing 90. The interior of the housing 90 further includes a retainer 117 for retaining the follower body 17 within the cylindrical housing 90. As is most easily seen in FIGS. 4 and 5, retainer 117 includes an arcuate flange 119 which overlies a bottom portion of the follower body 17, which captures it within the tubular body 90 since the upper end of the follower body 17 is retained by a portion of the wall of the tubular housing 90. A pair of retainer screws 123a, 123b are provided to secure the retainer 117 to the semicylindrical member 100. Threaded bores 124a, 124b in the semicylindrical member 100 receive the threaded ends of these screws 123a, 123b. These screws 123a, 123b are preferably staggered as illustrated in FIGS. 2 and 5 so as not to interfere with the lead wires of the eddy current probe 11. To minimize the amount of electromagnetic coupling between the eddy current probe 11 and the probe body 9, both the components of the midsection 48 and distal and proximal sections 50 and 52 are all made of a self-lubricating and easily fabricable plastic material such as Delrin.

The eddy current probe 11 of the probe assembly 10 generally includes a sensing coil 127 wound around a ferrite core 129 as shown, as well as a balancing coil 131 which is likewise wound around a ferrite core 133. The sensing and balancing coils 127 and 131 are serially connected by way of wires 134 which are disposed within a lateral bore 136 in the semicylindrical support member 100. The sensing coil 127 has lead wires 138 which are disposed in a similar lateral bore 140. These lead wires 138 are connected to slip rings (not shown) within the connector assembly 21 which in turn are electrically connected to the multiple wire electrical cable 33 leading to the eddy current circuitry. The ferrite core 129 disposed within the sensing coil 127 focuses the pulsating electromagnetic field generated by the coil 127 which allows a more intense coupling between this field and the copper plate 13. Both coils 127 and 131 are preferably formed from fine turns of copper wire, and their respective ferrite cores 129 and 133 are about 0.25 inches in diameter. The provision of the serially connected balancing coil 131 provides a "zero" reference point that the eddy current circuitry can use in measuring the degree of coupling which takes place between the sensing coil 127 and the copper plate 13. The focusing of the electromagnetic field generated by the sensing coil 127 by the ferrite core 129 in combination with the provision of balancing coil 131 renders the eddy current probe 11 sensitive to any changes which take place in the distance between the sensing coil 129 and the plate 13. As the copper plate 13 is connected to the rolling ball stylus 19 of the follower body 17, the previously described structure of the eddy current probe 11 results in a profile inspection apparatus 1 which is extremely sensitive to any changes in the diameter of the inner wall of the tube 3.

The copper plate 13 includes a disc portion 143 that is in close proximity to the sensing coil 127, as well as a screw portion 145 which may be screwed into the back of the tapered ball retainer 148 of the follower body 17. In the preferred embodiment, the plate 13 is formed from oxygen free, high conductivity copper in order to further increase the sensitivity of the eddy current probe 11 to changes in the distance between the sensing coil 127 and the plate 13. Located at the tip of the tapered ball retainer 148 is a stylus ball 19. In the preferred embodiment, ball 19 is approximately one-sixteenth of an inch in diameter, and is formed from ultra high molecular weight polyethylene. Such a stylus ball 19 has excellent wear characteristics, but yet is not so hard as to scour or to apply any significant amounts of localized pressure on the inner wall of the tube 3 being inspected. Located on either side of the follower body 17 are a pair of lug portions 150a, 150b. Spring guideposts 151a, 151b project from each of the lug portions 150a, 150b. When the wall follower assembly 15 is completely assembled as is illustrated in FIG. 4, nylon coil springs are disposed around the spring guideposts 106a, 106b of the cylindrical support member 100 and the spring guidepost 151a, 151b on the lug portions 150a, 150b. The use of nonmetallic springs 153a, 153b again allows the electromagnetic flux generated by the sensing coil 127 to couple almost completely with the copper disc 13.

In the method of the invention, all of the steps previously described in the "General Overview . . . " section of the specification are followed. Additionally, the current generator 34 is adjusted to conduct an alternating current having a frequency of approximately one megahertz through the sensing coil 127. The applicants have observed that the use of such a relatively high frequency in the sensing coil 127 results in a field shape which maximally couples with the copper plate 13. Lower frequencies could be used; however, much of the resulting flux could possibly couple with the walls of the Inconel ® tube 3, rather than the copper plate 13, thereby jeopardizing the accuracy of the device 1.

When the probe body 9 is initially positioned in the vicinity of the section of a tube 3 for which inspection is desired, it is important that circular centering members 84 and 86 located on the distal and proximal ends of the probe body 9 be placed in sections of the tube 3 which are substantially round to insure an accurate alignment between the longitudinal axis of the probe body 9 and the longitudinal axis of the tube 3. If either of these circular centering members 84 is disposed in a section of a tube 3 surrounded by a support plate 6 which has accumulated sludge deposits 8 as illustrated in FIG. 2, a misalignment between the probe body 9 and the interior of the tube 3 could occur, which in turn could disadvantageously result in inaccurate readings from the apparatus 1.

Figures 6A, 6B, 6C:
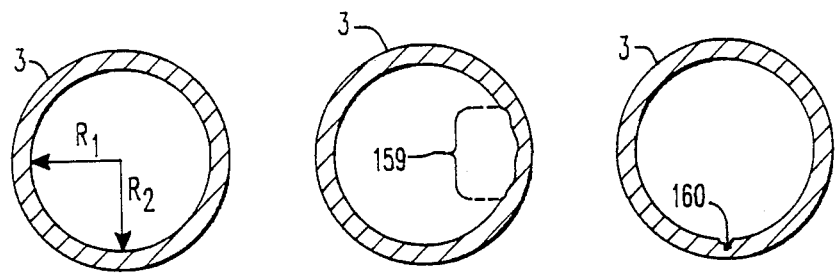
FIGS. 6A, 6B and 6C are cross-sectional views of heat exchanger tubes which have been ovately deformed, subjected to wall thinning or pitting, respectively.
Figure 7:
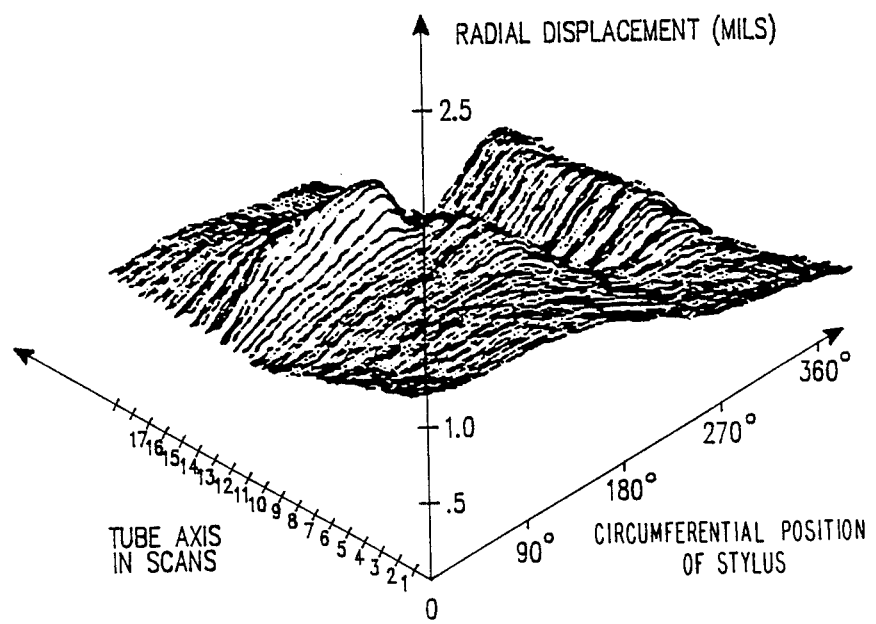
FIG. 7 is a graph of the output of the profile inspection apparatus of the invention illustrating how radial displacements of the rolling ball stylus of the apparatus are displayed as the stylus helically scans the inner wall of a tube.

The profile inspection apparatus 1 of the invention is readily capable of detecting the tube geometry changes illustrated in FIGS. 6A, 6B and 6C. In FIG. 6A. the section of the tube 3 being inspected has been subjected to a sufficient amount of mechanical pressure so as to induce a small degree of ovality to the tube 3, wherein R1 is greater than R2. Because of the mechanical configuration between the eddy current probe 11 and the copper plate 13 within the probe body 9 allows the wall follower assembly 15 to be extremely sensitive to even small changes in the internal diameter of the tube 3, the apparatus 1 of the invention is capable of detecting even small amounts of ovality in tubes 3 such as that illustrated in FIG. 6A. As previously mentioned, the ability to detect such ovality is extremely important, as such compressed sections of tubes 3 provide a sight for stress corrosion cracking to occur. The profile inspection apparatus 1 is further capable of easily detecting a thinned portion 159 occurring on the internal wall of a tube 3, as is illustrated in FIG. 6B. Because of the action of the rolling ball stylus 19 in resiliently translating the contour of the thinned section 159 into oscillations of the plate 13 relative to the sensing coil 127 of the eddy current probe 11, both the accuracy and the resolution of the resulting readout (exemplified by the graph in FIG. 7) is much higher than it would be if the sensing coil 127 were merely swept across the thinned section 159 in wiping contact. For all these reasons, the profile inspection apparatus 1 is also very capable of accurately and reliably detecting pitting flaws 160 which is illustrated in FIG. 6C. The resilient engagement of the rolling ball stylus 19 into and out of such a pit 160 would create a sharp oscillation between the sensing coil 127 of the eddy current probe 11 and the copper plate 13, which the eddy current circuitry and computer would convert into a well defined spike in the contour graph illustrated in FIG. 7. While it might be possible to detect the existence of such a pit 160 by merely wiping an eddy current coil 127 across the pitted area, the sensitivity of such an arrangement would be much less since the eddy current coil would "see" only a relatively small diminishment in the amount of impedance that the tube wall 3 exerted back onto the coil. Moreover, such a coil would not be able to accurately resolve the edges of such a pit 160 unless its diameter were equal to or less than the flaw itself. As there is a practical limit as to the size that such eddy current coils may be successfully made, the translation of such flaws 160 into a sharply defined, relative movement between an eddy current probe 11 and a copper plate 13 has significant advantages over the prior art.

We claim:

1. An apparatus for inspecting the profile of the inner wall of a conduit, comprising:
   a. a probe body insertable within said conduit:
   b. a probe assembly disposed within said probe body including a non-magnetic conductive plate means, and an eddy current probe means spaced from said plate means on one side thereof for generating a signal indicative of the distance between itself and said plate means, said plate and probe means being movably mounted with respect to one another to vary said distance, and
   c. a wall follower assembly movably mounted within said probe body including a follower body having an outside portion for resiliently following the profile of the inner wall of a conduit, and an inside portion fixedly connected to the plate means of said probe assembly on a side thereof opposite said one side for converting changes in the conduit wall profile to changes in distance between said probe means and said plate means of said probe assembly.

2. An apparatus as defined in claim 1 wherein said eddy current probe includes a sensing coil for electromagnetically coupling with said plate means, and a balancing coil connected to said sensing coil for selectively cancelling a portion of the signal generated by the sensing coil in order to enhance the sensitivity of the sensing coil.

3. An apparatus as defined in claim 1, wherein said plate means is formed substantially from copper.

4. An apparatus as defined in claim 1, wherein said plate means is formed substantially from oxygen free, high conductivity copper.

5. An apparatus as defined in claim 1, further comprising centering means for aligning said probe body with the longitudinal axis of the conduit.

6. An apparatus as defined in claim 1, wherein the outside portion of the follower body includes a stylus formed from a ball rotatably mounted in said follower body, and wherein the wall follower assembly includes means for resiliently engaging said stylus against the inner wall of a conduit.

7. An apparatus as defined in claim 6, wherein said follower body of the wall follower assembly includes at least one lug portion slidably mounted within said probe body, and said means for resiliently engaging said outside portion against the inner wall of a conduit includes a spring.

8. An apparatus as defined in claim 6, wherein said probe body and said wall follower assembly are formed from substantially nonconductive materials to maximize the extent to which the electromagnetic field emanated by the eddy current probe couples with the plate means.

9. An apparatus for inspecting the profile of the inner wall of a tube, comprising:
   a. an elongated probe body insertable within said tube;
   b. a probe assembly disposed within said probe body, including a conductive plate means formed from a material having a higher electrical conductivity than said probe body or said tube, and an eddy current probe spaced from said plate means on one side thereof for generating an electromagnetic field that predominantly interacts with said plate means in order to generate a signal indicative of the distance between the plate means and eddy current probe, said plate means and probe means being movably mounted with respect to each other to vary said distance, and
   c. a wall follower assembly mounted within said probe body and movable in a direction toward and away from the longitudinal axis of said probe body and having a first portion for resiliently following the inner wall of a tube and a second portion fixedly connected to the plate means of said probe assembly on a side thereof opposite said one side for converting changes in the tube wall profile to changes in distance between said plate means and said eddy current probe,
   wherein said eddy current probe includes a sensing coil for electromagnetically coupling with said plate means, and a balancing coil connected to said sensing coil for selectively cancelling a portion of the signal generated by the sensing coil in order to enhance the sensitivity of the sensing coil.

10. An apparatus as defined in claim 9, wherein said plate means is formed substantially from copper.

11. An apparatus as defined in claim 9, wherein said plate means is formed substantially from oxygen free, high conductivity copper.

12. An apparatus as defined in claim 9, further comprising centering means for aligning the longitudinal axis of the probe body with the longitudinal axis of a tube.

13. An apparatus as defined in claim 9, wherein said wall follower assembly includes a follower body, means for resiliently engaging the outside portion of the follower body against the inner wall of a conduit and wherein said outside portion of the follower body includes a stylus formed from a ball rotatably mounted in said follower body.

14. An apparatus as defined in claim 13, wherein said ball of said stylus is formed from ultra high molecular weight polyethylene.

15. An apparatus as defined in claim 9, wherein said wall follower assembly includes a follower body, and at least one spring formed from a substantially nonconductive material that resiliently engages said follower body for urging said first portion into engagement with the inner wall of a tube.

16. An apparatus as defined in claim 15, wherein said spring is formed from nylon.

17. An apparatus as defined in claim 15, wherein said probe body and said follower body are formed from substantially nonconductive materials to maximize the extent to which the electromagnetic field emanated by the eddy current probe couples with the plate means.

18. An apparatus for inspecting the radial profile of the inner wall of a tube formed from a nickel alloy to determine the degree to which the tube may be off-round, comprising:

a. an elongated probe body insertable within said tube;

b. a probe assembly disposed within said probe body, including a plate means formed from a material having substantially higher electrical conductivity than the nickel alloy forming said tube, and an eddy current probe having a sensing coil that circumscribes a ferrite core and a balancing coil, wherein said sensing coil and ferrite core creates a focused electromagnetic field that predominantly interacts with said plate means in order to generate a signal indicative of the distance between the plate means and sensing coil, and wherein said balancing coil cancels a substantial portion of the signal generated by the sensing coil in order to enhance the sensitivity of the sensing coil, said plate means being movably mounted with respect to said sensing coil;

c. a wall follower assembly having a follower body mounted within said probe body and movable in a direction orthogonal with respect to the longitudinal axis of said probe body, wherein said follower body has an outer end including a stylus means including a ball of ultra high weight polyethylene rotatably mounted in said follower body, and an inner end wherein said plate means is mounted, and said follower assembly further includes a pair of nylon springs that are supported by an interior wall of the probe wall at one end for resiliently urging said stylus of said follower body into resilient, riding contact with the inner wall of tube formed from a nickel alloy, whereby said wall follower assembly converts changes in the profile of the inner wall of a tube into changes in the distance between said plate means and said sensing coil, wherein said probe body and said follower body are formed from substantially nonconductive materials to maximize the extent to which the electromagnetic field emanated by the eddy current probe couples with the plate means.

19. An apparatus as defined in claim 18, wherein said plate means is formed substantially from oxygen free, high conductivity copper.

20. An apparatus as defined in claim 18, further comprising at least two centering means circumscribing either end of said elongated probe body for aligning the longitudinal axis of the probe body with the longitudinal axis of a tube.

21. An apparatus as defined in claim 18, further comprising eddy current circuitry connected to said eddy current probe for conducting alternating current of approximately one megahertz through said coils.

22. An apparatus as defined in claim 18, further comprising means for moving said probe body helically through said tube at a helical pitch of between about 20 to 30 mils and a speed of between about 300 to 700 rpm.

23. A method for inspecting the profile of the inner wall of a tube with a device that includes a probe body that is insertable within the interior of a tube, a probe assembly including a conductive plate means, and an eddy current probe means having a serially connected sensing coil and balancing coil for generating a signal indicative of the distance between itself and said plate means, and a wall follower means movably mounted to said probe body for converting changes in the profile of the inner wall of a tube into changes in the distance between the conductive plate means and the eddy current probe means, comprising the steps of:

a. inserting the probe body into the interior of a tube;

b. helically rotating the probe body at a helical pitch from between about 15 to 35 mils;

c. conducting a alternating current through said serially connected sensing coil and balancing coil of said eddy current probe at a frequency of between about 0.5 to 1.5 megahertz, and d. using said balancing coil to selectively cancel out a portion of the signal generated by the sensing coil to enhance the sensitivity of the sensing coil.

24. The method as defined in claim 23, wherein said probe body is helically rotated at a speed of between about 250 to 800 rpm.

* * * * *